G. W. MEYER & E. TWEED.
END GATE.
APPLICATION FILED MAR. 30, 1918.
1,281,992.
Patented Oct. 15, 1918.
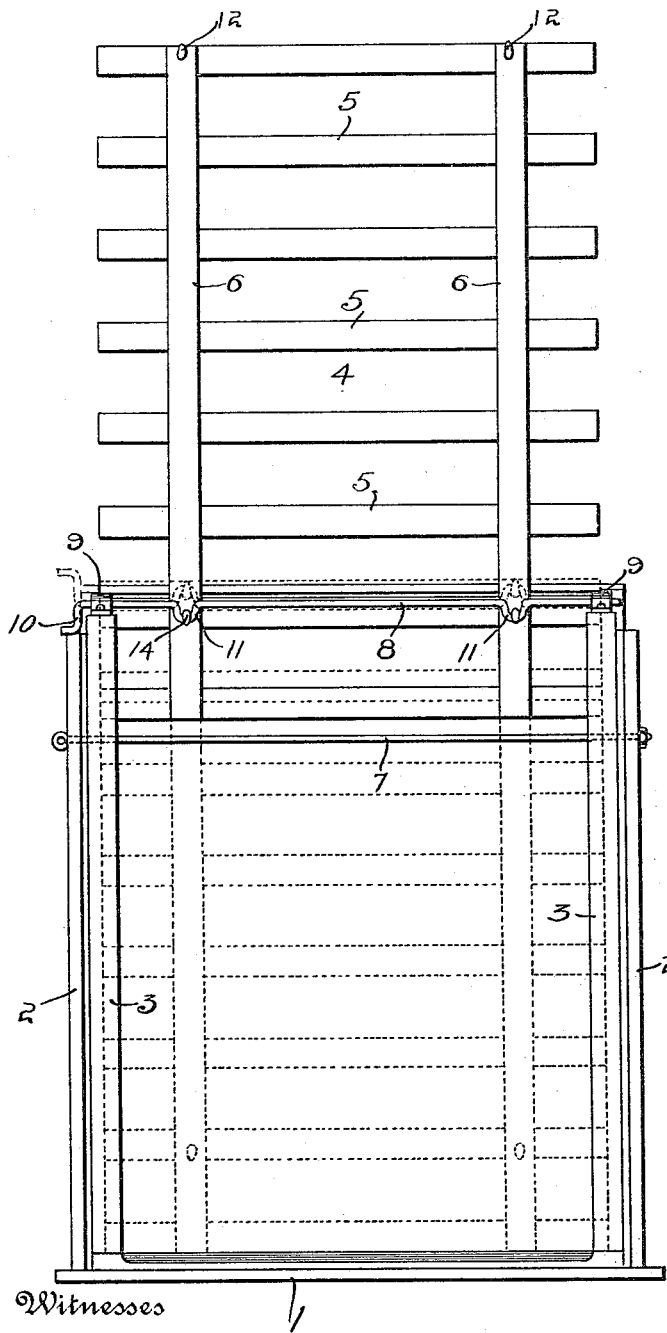
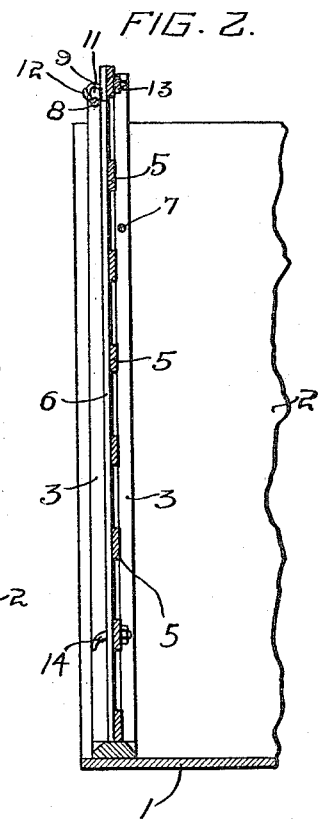
Inventors
George W. Meyer
AND
Ernest Tweed

UNITED STATES PATENT OFFICE.

GEORGE WILLIAM MEYER AND ERNEST TWEED, OF TIPTON, IOWA.

END GATE.

1,281,992.     Specification of Letters Patent.     Patented Oct. 15, 1918.

Application filed March 30, 1918. Serial No. 225,835.

*To all whom it may concern:*

Be it known that we, GEORGE W. MEYER and ERNEST TWEED, citizens of the United States, residing at Tipton, in the county of Cedar and State of Iowa, have invented new and useful Improvements in End-Gates, of which the following is a specification.

This invention relates to improvements in end gates for wagons and the like used in hauling hogs and other animals, the object of the invention being to provide an improved end gate of this kind which is arranged for vertical movement, to be opened or closed, and to also provide improved means for locking the end gate either when in closed lowered position or in raised open position, and also for supporting and holding the end gate when the same is in raised position.

With the above and other objects in view, the invention consists in the construction, combination and arrangement of devices as hereinafter described and claimed.

In the accompanying drawing,

Figure 1 is an elevation of an end gate constructed and arranged in accordance with our invention, showing the same in raised, open position in full lines and in lowered closed position in dotted lines.

Fig. 2 is a vertical sectional view of the same.

For the purpose of this specification, we show a wagon body or bed 1, provided with hog racks 2 at the sides, the said racks being provided at their rear ends, on their inner sides, with spaced holder and guide strips 3 between which the end gate 4 is arranged for vertical sliding movement. The end gate is here shown as comprising spaced horizontal bars 5 and vertical bars 6 to which the bars 5 are secured, the ends of the bars 5 engaging in the grooves formed between the strips 3. We also show a tie bolt rod 7 which connects the racks at a suitable distance from their upper sides and which serves to securely hold the racks and prevents them from spreading apart.

In accordance with our invention, we provide a locking rod or shaft 8 which is mounted for locking movement in suitable bearings 9 at the upper sides and rear ends of the racks. The shaft 8 is provided at one end with a crank 10 to enable said shaft to be readily turned and said shaft is also formed, at points opposite the vertical bar 6 of the end gate with locking loops 11 which are bent therefrom and are substantially U shaped.

The gate is provided near its upper end with upwardly turned hooks 12 which have shanks that pass through the bar 6 and the upper cross bar 5 and are secured thereto by means of nuts 13. These hooks 12 are adapted to be engaged by the locking loops 11 when the gate is lowered and closed, so that said loops and said hooks co-act to lock the gate in such position as will be understood.

Near the lower side of the gate are downwardly turned locking and holding hooks 14 which are identical in construction with the hooks 12, excepting that their position is reversed, said hooks 14 having their shanks passed through and fastened to said vertical bars 6 and to the next to the lowermost cross bar 5 of the gate.

When the gate has been raised to open position, the shaft or locking rod 8 may be partly turned to engage its locking loops 11, under said hooks 14 and to co-act therewith to hold and support the gate in such elevated position. It will be understood that it is only required to partly turn the shaft or locking rod 8, which can be easily done, in order to cause said shaft or rod to lock and hold the gate either in lowered or raised position.

We claim:

In combination with guiding means, an end gate mounted for vertical sliding movement in said guiding means and provided with hooks near its upper and lower ends, and a locking shaft mounted for locking movement on said guiding means and arranged to extend across and to one side of the gate, said locking shaft being provided with locking loops which may be arranged in engagement with either the upper or the lower hooks by partly turning said shaft, to hold and lock the gate in either lowered or raised position.

In testimony whereof we affix our signatures.

GEORGE WILLIAM MEYER.
ERNEST TWEED.

Copies of this patent may be obtained for five cents each, by addressing the "Commissioner of Patents, Washington, D. C."